Figure 4:
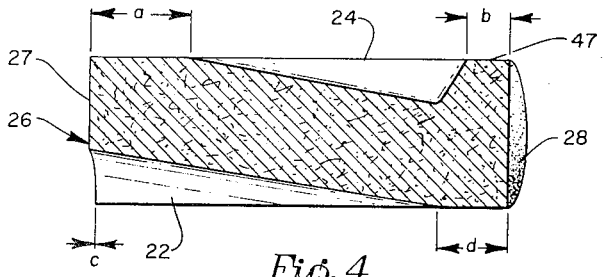
Figure 5:
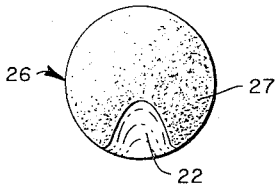
Figure 6:
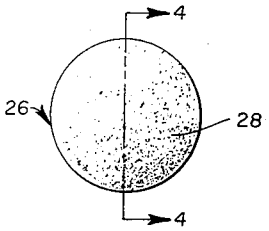
Figure 7:
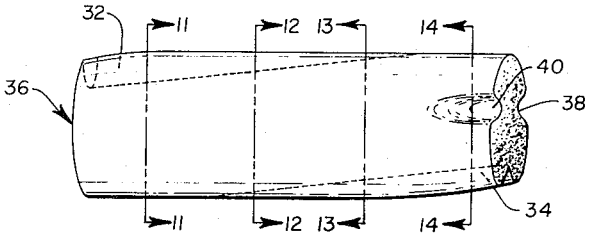
Figure 8:
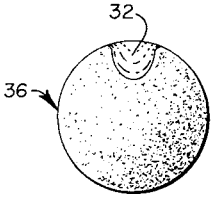
Figure 9:
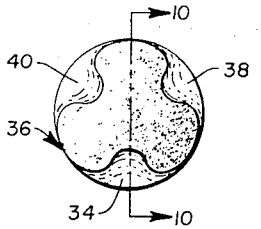
Figure 10:
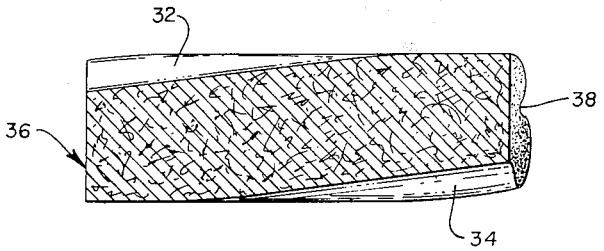
Figure 11:
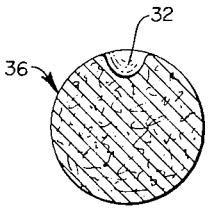
Figure 12:
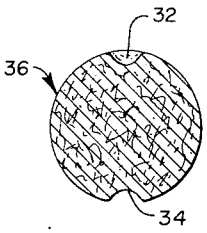
Figure 13:
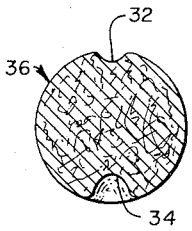
Figure 14:
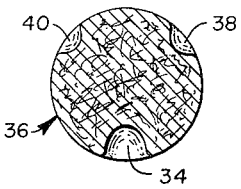
Figure 18:
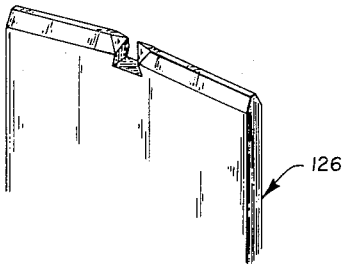
Figure 15:
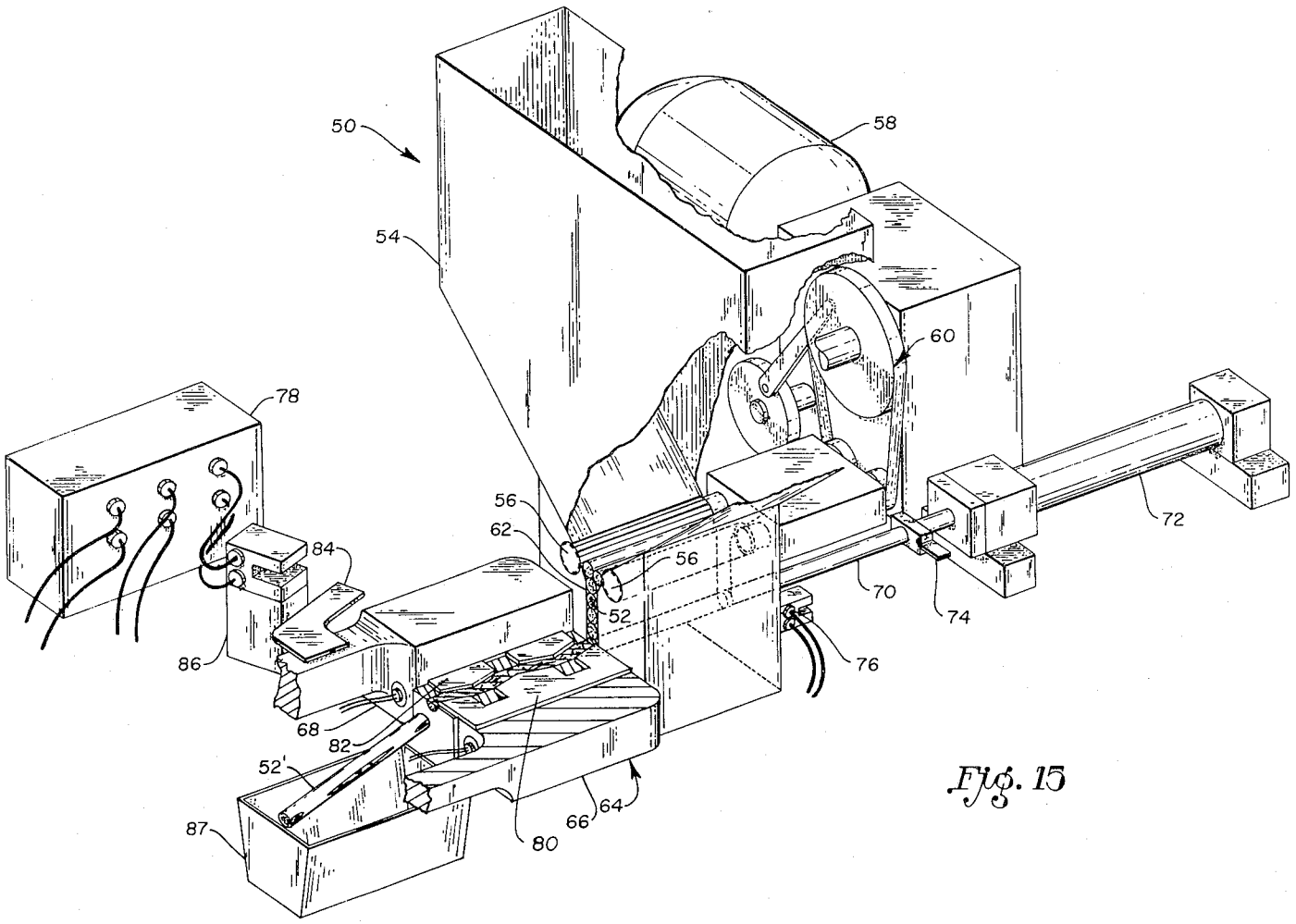
Figure 16:
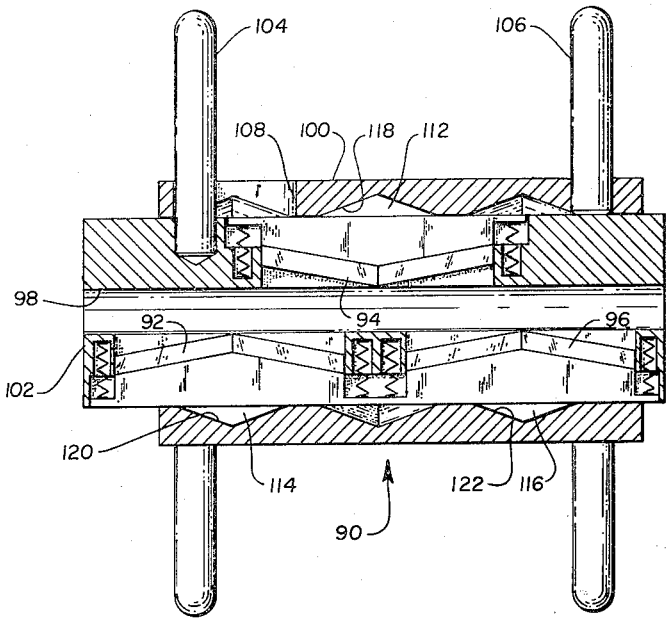
Figure 17:
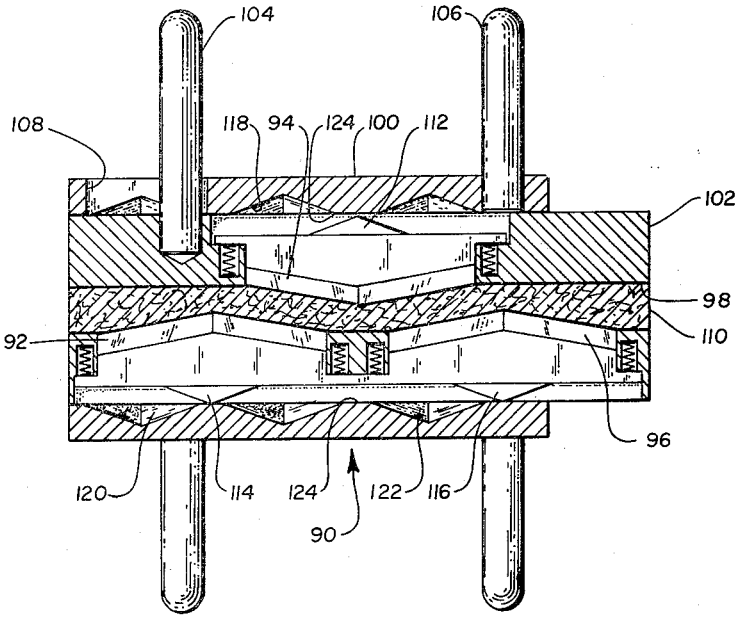

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 6, 1975

934 OG 8

T934,007

METHOD AND APPARATUS FOR FORMING A DIAGONAL FLOW FILTER FROM CYLINDRICAL TOBACCO SMOKE FILTER RODS

Robert C. Mumpower II, 2104 King Mill Pike, Bristol, Va. 24201

Continuation of application Ser. No. 234,434, Mar. 13, 1972. This application Nov. 28, 1973, Ser. No. 419,757

Int. Cl. B29j *5/00*

U.S. Cl. 264—109

5 Sheets Drawing. 21 Pages Specification

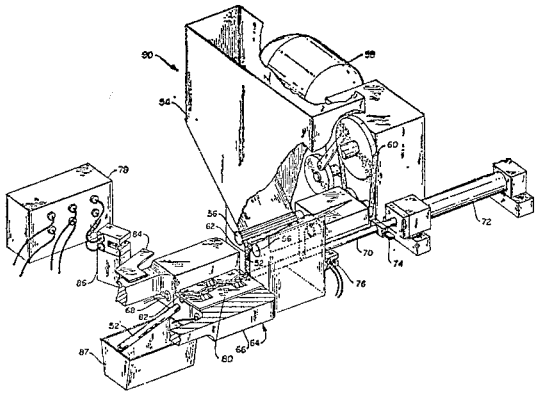

Method and apparatus for forming a diagonal flow filter from a cylindrical tobacco smoke filter rod, the apparatus including heated indenter blades or dies positioned within a mold for movement into engagement with the exterior surface of a filter rod to form in the filter rod one or more oppositely disposed first and second indentations of predetermined lengths and widths. The first and second indentations each extend longitudinally along the length of the filter rod and extend from the surface of the filter rod into the body of the filter rod to predetermined depths along such predetermined lengths. Each of the first indentations is offset with respect to each of the second indentations in a direction parallel to the longitudinal axis of the filter rod. One or more secondary, shorter indentations may be provided to alter to some degree the smoke flow by causing in the resulting filter some smoke to be diverted toward the shorter indentations. The indenter blades or dies remain in such engagement for a predetermined length of time sufficient to mold the indentations in the filter rod.

METHOD AND APPARATUS FOR FORMING A DIAGONAL FLOW FILTER FROM CYLINDRICAL TOBACCO SMOKE FILTER RODS
Original Filed March 13, 1972 5 Sheets-Sheet 1
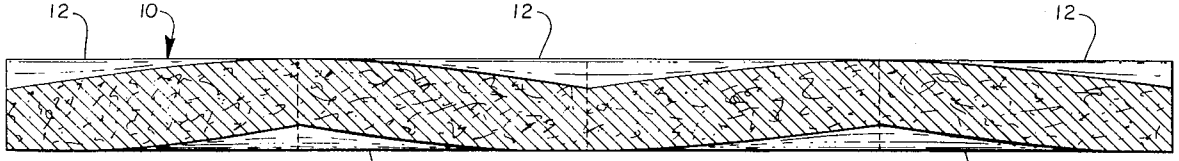
Fig. 1
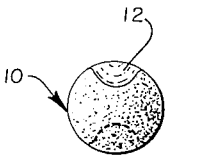
Fig. 1-A
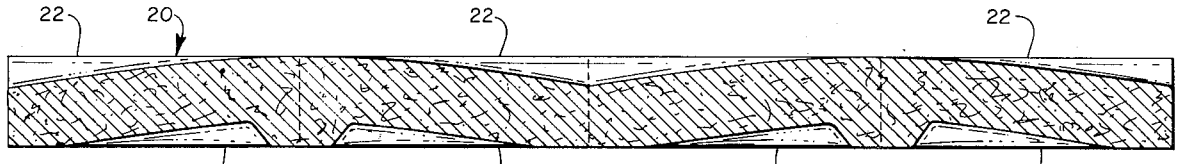
Fig. 2
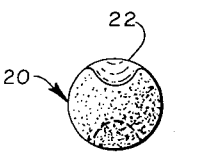
Fig. 2-A
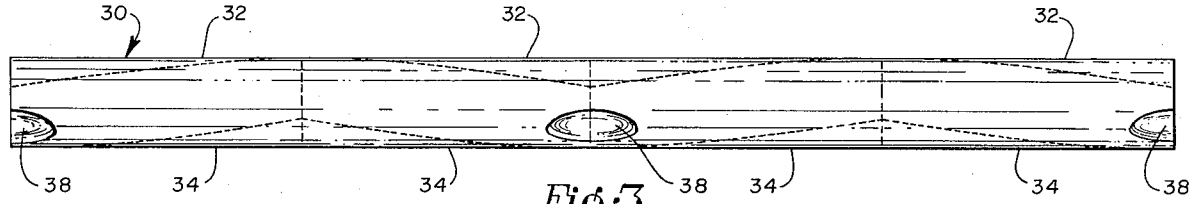
Fig. 3
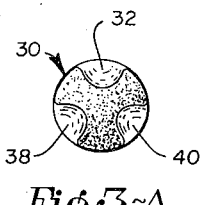
Fig. 3-A